Nov. 29, 1966 R. A. LINDER 3,289,089

BALANCED VIDEO GATE

Filed July 5, 1963 2 Sheets-Sheet 1

INVENTOR.
Richard A. Linder,
BY
H. W. Losche
Att'ys.

Nov. 29, 1966 R. A. LINDER 3,289,089

BALANCED VIDEO GATE

Filed July 5, 1963 2 Sheets-Sheet 2

INVENTOR.

Richard A. Linder,

BY

H. H. Losche

Att'ys.

United States Patent Office 3,289,089
Patented Nov. 29, 1966

3,289,089
BALANCED VIDEO GATE

Richard A. Linder, Baltimore, Md., assignor, by mesne assignments, to The United States of America as represented by the Secretary of the Navy Filed July 5, 1963, Ser. No. 293,211
8 Claims. (Cl. 328—69)

This invention relates to gating circuits and more particularly to balanced video gating circuits having a video gate and a duplicate gate switched by the same control signal to produce nearly identical switching transients applied to a circuit for cancellation of the gate switching transients and to provide an output selectable in phase with the input or 180° out-of-phase with the input.

In most of the known balanced gating circuits two control signals 180° out-of-phase are used to produce cancellation of the switching transients or switching voltage pedestals of the two control waveforms. Complete elimination of the switching transients or voltage pedestals is difficult since it is very difficult to develop two stable control wave forms that will cancel completely. In these prior known balanced gate circuits it is the usual practice to use an inverter circuit in the output when it is necessary to gate an output of the input video signals 180° out-of-phase.

In the present invention a gating circuit and a dummy or duplicate gating circuit are used which are switched by the same control voltage switching input to the gating circuits and these two gating circuits are substantially identically biased to provide identical switching transient outputs. Only one of the gating circuits have video signals applied thereto so that this gating circuit provides the video output plus switching transients while the dummy or duplicate gating circuit provides only switching transients on its output. The gating circuit outputs are applied to a differential amplifier which almost completely cancels the switching transients thereby leaving only the video signals for amplification. It is therefore a general object of this invention to provide a balanced video gate circuit having two identical gates switched by a common control voltage and only one of which receives video signals to be gated with the outputs of the balanced gate coupled to a differential amplifier for nearly complete cancellation of the switching transients or switching pedestals and amplification of the video signals.

These and other objects and the attendant advantages, features, and uses of this invention will become more apparent to those skilled in the art as the description proceeds when considered along with the accompanying drawing in which.

Figure 1:
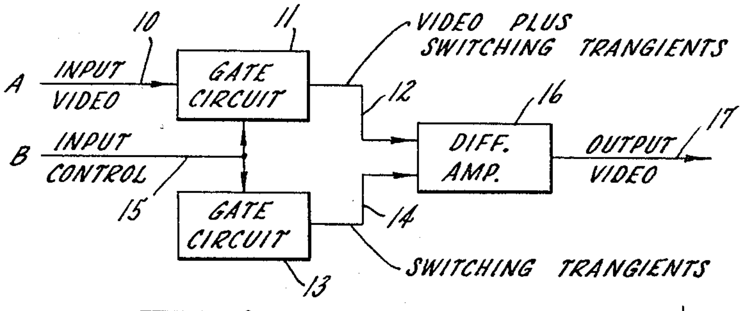
FIGURE 1 is a block circuit diagram with arrows on the several conductor means showing the direction of signal information.

Referring more particularly to FIGURE 1, input video signals A are adapted to be coupled to an input conductor means 10 of a gating circuit 11 which will gate the video signals A on an output 12 thereof and which will also include switching transients or switching voltage pedestals generated in the gate circuit 11 to provide the gating function. A second dummy or duplicate gating circuit 13 has an output 14 on which is produced only the switching transients or switching voltage pedestals as hereinafter will be made clear. A switching control voltage B is supplied over a conductor means 15 to both gating circuits 11 and 13 such that the switching transients or switching voltage pedestals on the outputs 12 and 14 of the two gates will be substantially identical. The gating circuit outputs 12 and 14 are applied to a differential amplifier 16 the output of which is on conductor means 17 which will cancel the voltage pedestals but produce amplification of the video signals A applied over the input conductor 10.

Figures 2, 3, 4:
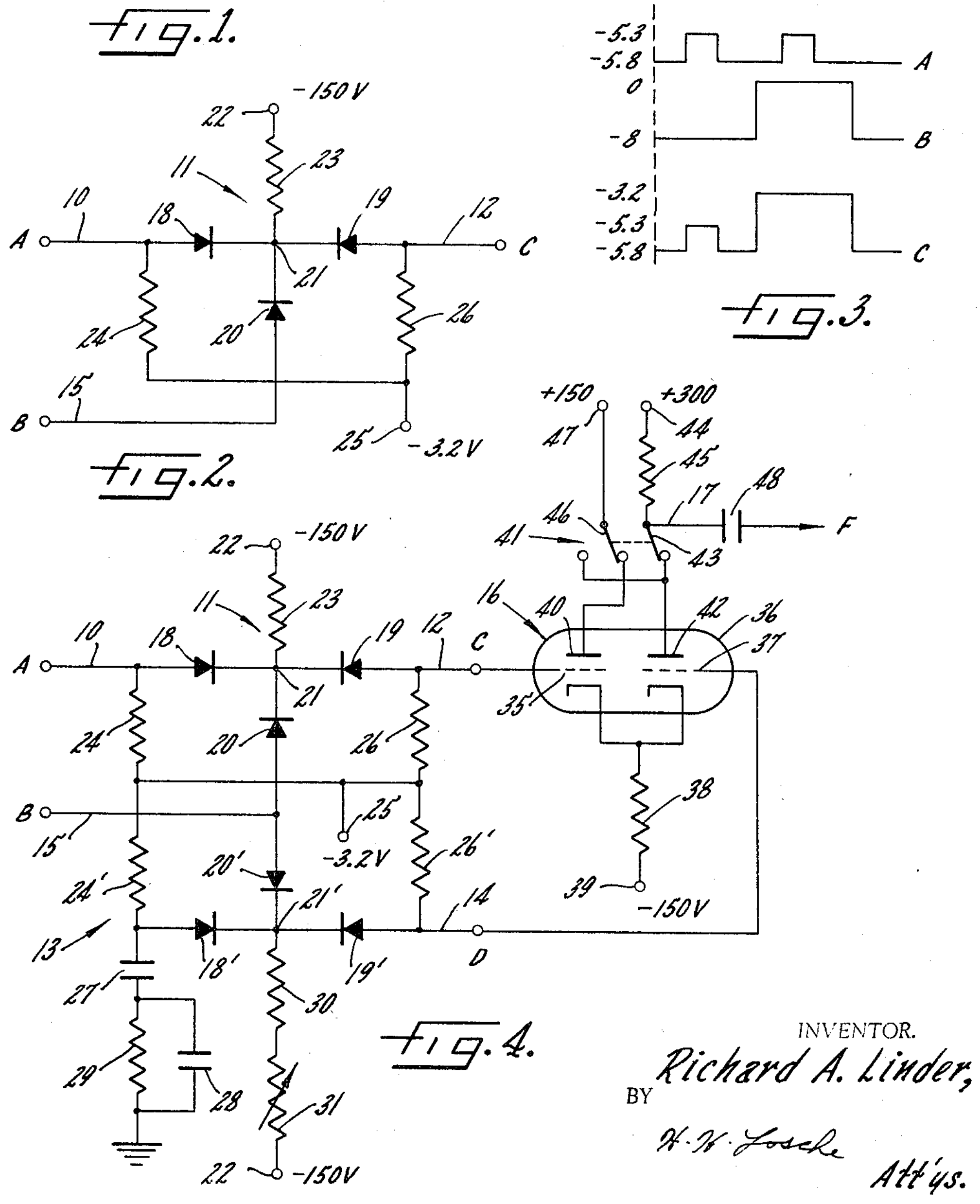
FIGURE 2 is a circuit schematic of the gate circuit gating the video signals.
FIGURE 3 shows the waveforms of video signals and switching transients producible in the circuit of FIGURE 2.
FIGURE 4 is a complete circuit schematic of the block circuit shown in FIGURE 1.

Referring more particularly to FIGURES 2 and 3, FIGURE 2 illustrates in schematic detail the gating circuit 11 of FIGURE 1 and therefore like reference characters will be applied to like parts. Three substantially matched diodes 18, 19, and 20, have their cathodes coupled in common to a terminal 21 which is supplied a biasing voltage from a terminal source 22 through a biasing resistor 23. The diodes may be of any suitable type but preferably may be the crystal rectifying type. The anode of the diode 18 has the input conductor 10 connected thereto, the anode of diode 19 has the output conductor 12 connected thereto, and the anode of diode 20 has the conductor 15 connected thereto. The anode of diode 18 also has a biasing resistor 24 coupling it to a voltage source applied at 25 while the anode of diode 19 has a biasing resistor 26 coupling it to the voltage source 25. Purely for the purpose of providing an operative example herein, the voltage source 22 is indicated as having a −150 volts applied thereto while the voltage source 25 is shown for the purpose of example as having a −3.2 volts applied thereto. The input control voltage B is a switching voltage which is usually switched from zero to −8 volts. When a −8 volts is applied at B to the anode of the diode 20, and in the absence of a video input signal at A, the gating circuit 11 will be open or conductive to input signals from A to C. Resistor 23 provides a constant current source in which half of this current flows through each of the forward biased diodes 18 and 19 causing a voltage drop of 2.6 volts across resistors 24 and 26. In this condition with the voltage applied as shown, the resistors 23, 24, and 26, are such that a −6.3 volts exists at terminal 21 and a −5.8 volts exists at the anodes of each of diodes 18 and 19, the voltage drop across each diode being .5 volt. The −8 volts at terminal B back biases the diode 20, effectively removing diode 20 from the circuit by a back bias of 1.7 volts, while diodes 18 and 19 are forward biased for passing video signals. As shown in FIGURE 3, in this condition of the gate circuit 11, video signals at A will be conducted through to the output 12. The transfer function of this circuit is linear for signals less than 1 volt. For input signals greater than 1 volt, the output gradually bends into a limiting function. Since both diodes 18 and 19 are forward biased during the signal transfer, the small signal insertion loss of this circuit is less than .5 decibel (db). The bias resistors 24 and 26 and the −3.2 supply voltage were chosen for example herein to optimize the gate for positive unipolarity signals. This choice was governed by the application for which it was designed. This gate circuit, however, is very flexible and it could be readily optimized for either negative unipolar or for bipolar signals by changes in the gate bias. When the control voltage at B is raised to zero, the diode 20 will be forward biased clamping the terminal 21 at −.5 volt which in turn causes diodes 18 and 19 to have a 2.7 volts back bias. The control voltage at B is not critical to produce gate circuit operation since it is only necessary for the control level to be greater than —2.7, in the above example of voltage biases, when the gate is to be closed, and less than —6 volts when the gate is to be open. The control voltage of zero to —8 volts at B is recognized as a standard gate switching signal although these voltages may be changed as expedient or desired. The control voltage at zero closes the gate as shown by the waveforms B and C in FIGURE 3. With this gate closed, positive video signals less than 3.2 volts in amplitude and all negative signals see diodes 18 and 19 as high series impedances and diode 20 as a very low shunt impedance. Positive video signals larger than 3.2 volts will forward bias diode 18 and possibly back bias diode 19. The back bias on diode 19, however, will be increased causing its impedance to increase. As a net result, the gate attenuation will decrease slightly on very strong positive video signals, but will never break down completely. It may be seen, then, that as video signals are applied to terminal A they will be gated as shown by waveform B to produce both the video signal and the transients or switching voltage pedestals as shown by waveform C in FIGURE 3. In FIGURE 3 it may be observed that the video signals were arbitrarily given an amplitude of .5 volt for the purpose of example although these signals may be of other amplitudes as hereinabove described.

Referring more particularly to FIGURE 4 there is shown a complete circuit schematic of FIGURE 1 with like reference characters as applied to FIGURES 1 and 2 for like parts. Since the dummy or duplicate gating circuit 13 is substantially identical in configuration with the gate circuit 11, similar or corresponding parts have the same reference characters primed (′) for simplicity of reference and understanding. In the dummy or duplicate circuit 13 the series-parallel circuit consisting of the capacitors 27 and 28 and resistor 29 have been added to the anode of the diode 18′ to compensate for the video signal source input at 10 on the anode of the diode 18. For best results, this compensating circuit should be optimized for each particular application. This can be readily done by analyzing the video driving circuitry. The compensating network shown was used when driving the video input from the plate of a triode video amplifier. To eliminate the gating circuit switching pedestal as shown by the waveform B in FIGURE 3 on the output 12 of gating circuit 11, the gating circuit 13 produces a nearly identical switching transient voltage or pedestal voltage as shown by the waveform D in FIGURE 5 on the output 14. This nearly identical switching voltage or pedestal voltage waveform D is accomplished in the gating circuit 13 by virtue of the diodes 18′, 19′, and 20′ being identically biased with those in the gating circuit 11 and, most important, both gates are switched by the common input 15 or switching voltages B as shown in FIGURE 2. The gating circuit 13 has the terminal point 21′ biased through the resistor 30 and a variable resistor or potentiometer 31 from the voltage source 22. The variable resistance 31 is used to balance the switching or pedestal control voltage by controlling the current through the resistors 24′ and 26′ thereby controlling the amplitude of the switching pedestal for the gate circuit 13.

Figure 5:
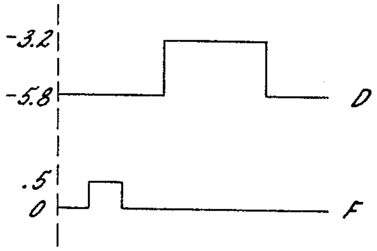
FIGURE 5 shows waveforms in addition to those of FIGURE 3 which are produced by the circuit schematic of FIGURE 4.

Again referring to FIGURES 4 and 5, the output 12 to terminal C from the gating circuit 11 is applied as an input to the grid 35 of a twin triode tube 36 of a differential amplier circuit 16. The output 14 from the gating circuit 13 to terminal D is applied to the second input, the grid 37, of the twin triode tube 36. The cathodes of the twin triode tube 36 are coupled in common through a cathode biasing resistor 38 to a negative voltage source at terminal 39, this negative voltage source being shown for the purpose of example herein as —150 volts. The anode 40 of the twin triode tube 36 is coupled to a center tap of a double-pole-double-throw switch 41, while the anode 42 is coupled to the two outer switch poles of the switch 41. Switch blade 43 of the switch 41 is coupled to a supply voltage at terminal 44 through an anode load resistor 45 while the switch blade 46 is coupled to a terminal voltage source at terminal 47. Here again, purely for the purpose of example, the terminal 44 is shown as being supplied a voltage of +300 volts while the terminal 47 is shown as being supplied a +150 volts. The switch blade 43 is also coupled to the output conductor 17 through a coupling capacitor 48 providing the output F as shown in FIGURE 5. While switch 41 is shown herein to enable outputs over 17 to be in phase or 180° out-of-phase with the input 10, it is to be understood that the switch could be eliminated and the connections reversed to the anodes as phase changes are needed.

For the purpose of carrying out one example of operation of the invention the values of elements are given hereinbelow for the voltages illustrated in the drawing:

Resistors:

| | |
|---|---|
| 23 | 100K. |
| 24, 24′ | 3.48K. |
| 26, 26′ | 3.48K. |
| 29 | 100K. |
| 30 | 68K. |
| 31 | 50K. |
| 38 | 22K, 2W. |
| 45 | 47K, 1W. |

Capacitors:

| | |
|---|---|
| 27 | .015μf. (microfarads). |
| 28 | 56μμf. |
| 48 | 2μf. |

OPERATION

In the operation of the device shown in FIGURE 4 let it be assumed first that a switching control voltage B of —8 volts is applied on the conductor means 15 which will back bias both diodes 20 and 20′ and forward bias the diodes 18, 19 and 18′, 19′ in the two gating circuits 11 and 13 opening the two gates to conduction. A video signal as shown in the waveform A, FIGURE 3, applied over the conductor means 10 to the gate circuit 11, will be conducted over the conductor 12 to the grid 35 of the twin triode differential amplifier 36. At the same time gate 13, having no signals applied at the anode of the diode 18′, will produce no voltage change on the grid 37 of the twin triode differential amplifier 36 as shown in waveform D of FIGURE 5. Consequently, the video signal will be conducted through the differential amplifier circuit 16 and produce on the output 17 the amplified waveform as shown by F in FIGURE 5. When the control voltage B is switched to zero voltage, both gates 11 and 13 will be closed but in closing will produce the transient or pedestal voltages as shown by the waveform B in FIGURE 3 and the waveform D in FIGURE 5. Since the gate 11 is closed, the second video pulse, as shown by the waveform A in FIGURE 3, will be inhibited and only the transient or pedestal voltage B will be shown on the output C, as shown in FIGURE 3. Upon the application of the pedestal voltage B on the grid 35 of the twin triode 36 the cathode voltage of both cathodes will be raised accordingly in cathode follower action by virtue of the development of this voltage across the cathode resistor 38 and by virtue of the two cathodes being coupled in common. At precisely the same time the pedestal voltage D from the gating circuit 13 will be applied to the grid 37 of the twin triode 36 such that the grid 37 and its cathode will rise precisely in the same manner and to the same amplitude to almost exactly nullify the effects of the two switching transient voltages or pedestal voltages B and D so that there will be no amplification whatsoever of these pedestal voltages on the output 17 as shown by F in FIGURE 5. Accordingly, only the video signals applied at terminal 10 to the gating circuit 11 will be amplified on the output 17 of the differential amplifier when the gates 11 and 13 are open for conduction. The circuit as shown with the switch 41 in the position shown will produce the output video signal on the output 17 exactly in phase with the input video signal and this video signal will not be shifted in phase through this stage. If it is desired to phase shift the output signal 180° from the input signal, switch 41 may be switched to the left.

Figure 6:
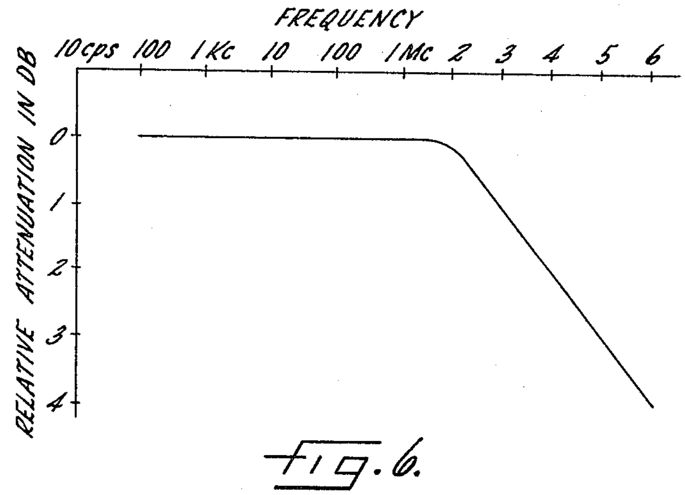
FIGURES 6 and 7 show graphs of the relative frequency and attenuation, and the R.S.M. volts and attenuation, respectively, for the circuit of FIGURE 4.
Figure 7:
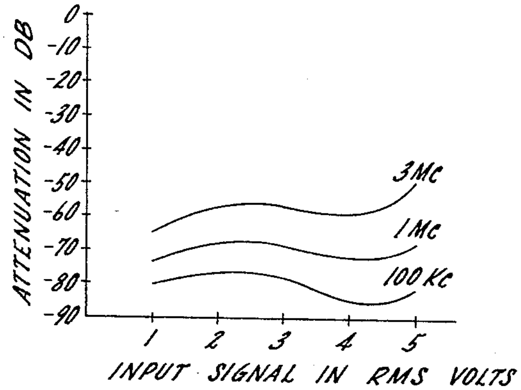

By the construction shown and described herein any imperfection in the switch control voltage B applied on the conductor means 15 will affect both gating circuits in like manner and any such switching imperfection will be cancelled out in the differential amplifier as hereinabove described. FIGURE 6 contains the amplitude versus frequency characteristic for the circuit shown in FIGURE 4. The upper 3 db cutoff frequency, for unity gain (1K. load resistor), is 5 megacycles, thus, the circuit gain bandwidth product is 5 megacycles. The gate attenuation characteristics are shown in FIGURE 7. As shown in FIGURE 7 the diode arrangement provides good attenuation characteristics and it can be seen that even on strong input signals the gate leakage is very small. It has been found that the balanced gate does not have an insertion loss with a 1 megacycle bandwidth, but rather it has a nominal gain of +14 db into a 1000 ohm channel. For a bandwidth of 1 megacycle, the minimum insertion loss with the gate closed is 60 db which is much more than ordinarily required.

It is to be understood that the several voltages applied at terminals 22, 39, 44, and 47 are precisely stated for the purpose of giving an operative example herein. It is to be understood that other voltage values may be used with equal facility when the proper biases are applied to the switching diodes. These voltages are shown purely for the purpose of example and are not to be in any way limiting to the invention. While many other modifications and changes may be made in the constructional details and features of this invention to carry out the inventive concept as shown and described herein, it is to be understood that I desire to be limited in my invention only by the scope of the appended claims.

I claim:

1. A balanced video gate comprising:
a gate circuit having a video input, a gate control input, and a video output for gating video signals applied to the input thereof;
a duplicate gate circuit having a compensating circuit input, a gate control input coupled in common with the gate control input of said gate circuit, and having an output;
a compensating circuit coupled to said compensating circuit input to match the impedance on said video input;
a differential amplifier having two inputs coupled to one each output of said gate and duplicate gate circuits and having an output; one input receiving the gated video signals and the gate switching transient voltages and the other input receiving the gated switching transient voltages of the duplicate gate circuit whereby the gate switching transient voltages essentially cancel in said differential amplifier and said video signals are amplified on the output thereof.

2. A balanced video gate as set forth in claim 1 wherein
said gate and duplicate gate circuits are identically biased diode gates; and
said differential amplifier is a twin triode vacuum tube, the grid of each triode constituting said two inputs.

3. A balanced video gate as set forth in claim 2 wherein
each said gate circuit includes three diodes with the cathodes thereof coupled in common, two of the three diodes being in series from said video input to said video output and the third of said diodes being coupled to said gate control input; and
voltage biasing means coupled across the common cathode coupling and the anodes of said two of the three diodes.

4. A balanced video gate as set forth in claim 3 wherein said twin triode differential emplifier has said output selectively switchable to either triode anode to selectively provide 0° and 180° phase of the video amplified output signal.

5. A balanced video gate comprising:
a first gate circuit having first, second, and third diodes with the cathodes thereof coupled in common, the anode of the first diode coupled to an input of video signals, and the anode of the second diode coupled to an output;
a second gate circuit having first, second, and third diodes with the cathodes thereof coupled in common, the anode of the first diode having an impedance matching input, the anode of the second diode coupled to an output, the anodes of the third diodes in both the first and second gate circuits coupled in common to a gate control input, the common coupling of the diode cathodes in both said first and second gate circuits being coupled to a voltage source through equal biasing resistances, and said anodes of the first and second diodes of both said first and second gate circuits being coupled to said voltage source through equal resistances to provide equal switching voltage pedestals on the outputs of the first and second gate circuits together with gated video signals on the output of said first gate circuit; and
a differential amplifier having two inputs coupled respectively to the two outputs of said first and second gate circuits and having one output whereby said voltage pedestals cancel in said differential amplifier and said gated video signals are amplified on said one output.

6. A balanced video gate as set forth in claim 5 wherein said differential amplifier is a twin triode tube, the grid of each constituting said two inputs and the output conducted selectively from either anode to obtain selective in-phase and 180° out-of-phase signal amplification, and the cathodes coupled to a cathode biasing source through resistance means whereby video signals will be amplified and voltage pedestals produced in said gate circuits will cancel one from the other.

7. A balanced video gate as set forth in claim 6 wherein said output conducted selectively from said differential amplifier is a double-pole-double-throw switch, to one switch blade is coupled an anode voltage through an anode resistor, and to the other switch blade is coupled an anode voltage directly.

8. A balanced video gate as set forth in claim 7 wherein said first diode of said second gate circuit is matched in impedance with the input to the first diode of the first gate circuit, and
said biasing resistance to the common coupling of said diode cathodes of said second gate circuit is adjustable.

References Cited by the Examiner

UNITED STATES PATENTS

| | | | |
|---|---|---|---|
| 3,122,723 | 2/1964 | Lewinstein et al. | 328—117 |
| 3,199,034 | 8/1965 | Ritter | 328—117 |
| 3,210,668 | 10/1965 | Stull | 307—88.5 |

FOREIGN PATENTS

| | | |
|---|---|---|
| 357,109 | 11/1961 | Switzerland. |

JOHN W. HUCKERT, *Primary Examiner.*

J. D. CRAIG, *Assistant Examiner.*